April 30, 1940.  H. J. COATES  2,199,098
ELECTRIC MOTOR CONTROL SYSTEM
Filed Nov. 15, 1938
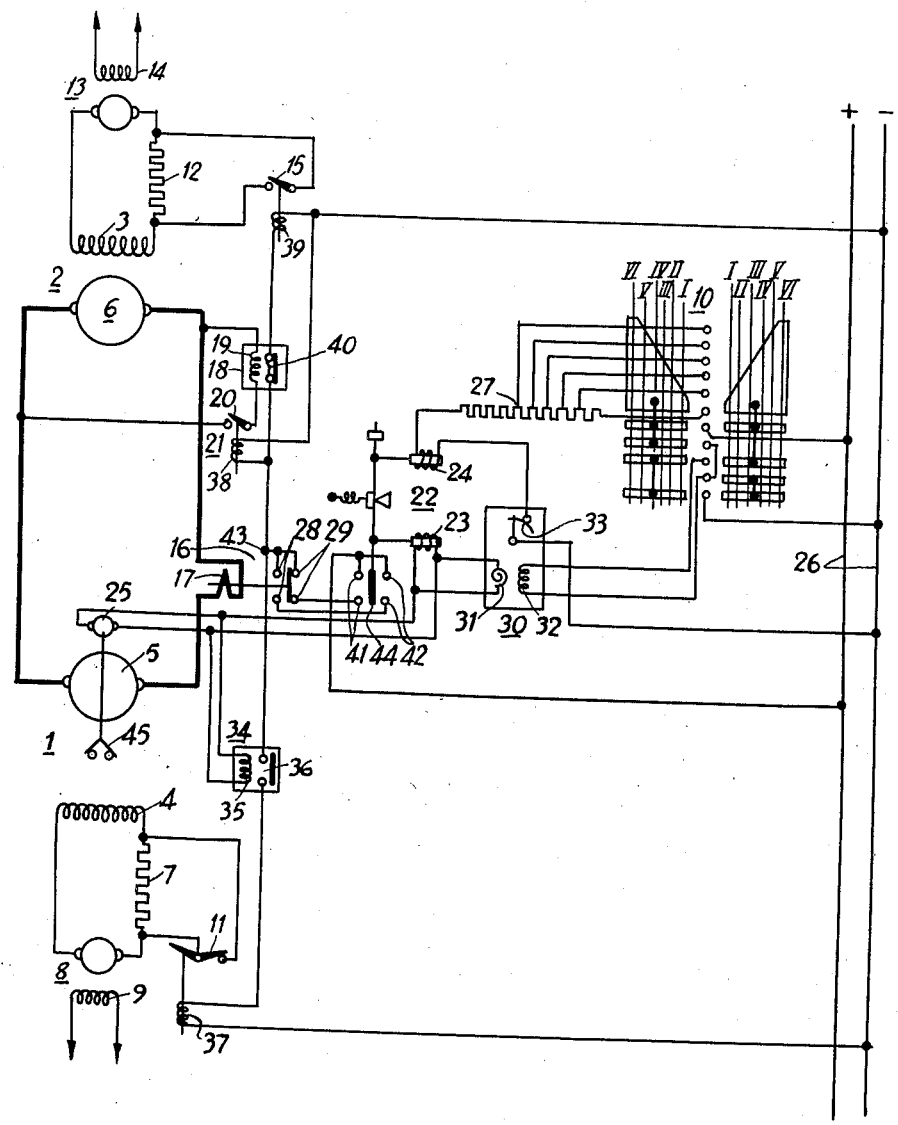
INVENTOR
HERBERT JOHN COATES
BY
ATTORNEY Patented Apr. 30, 1940

2,199,098

UNITED STATES PATENT OFFICE 2,199,098

ELECTRIC MOTOR CONTROL SYSTEM

Herbert John Coates, Erdington, Birmingham, England, assignor to The General Electric Company Limited, London, England Application November 15, 1938, Serial No. 240,456
In Great Britain November 10, 1937

5 Claims. (Cl. 172—239)

This invention relates to electric motor control systems and more particularly to electric motor control systems of the kind in which a motor is arranged to be supplied by a generator, regulation of the speed of the motor being controlled by variation of the generator field excitation and, if desired, further speed control being obtained by variation of the motor field excitation. Regulation of the direction of rotation of the motor may be controlled by regulation of the generator excitation also. An object of the present invention is the provision in a system of the kind specified of protection against unsafe conditions such as excessive current, voltage or speed.

According to a feature of the present invention, in an electric motor control system of the kind specified, during the change of field flux in a machine due to a control being effected to regulate the speed or the direction of rotation of the motor, upon the occurrence of an unsafe condition such, for example, as overcurrent in the generator-motor circuit, the rate of change of flux is retarded.

According to another feature of the present invention, in an electric motor control system of the kind specified, means are provided for accelerating the change of field flux in a machine due to a control being effected to regulate the speed of the motor and upon the occurrence of an unsafe condition such, for example, as overcurrent in the generator-motor circuit, the said means are rendered ineffective.

The present invention includes an electric motor control system of the kind specified, wherein field forcing of the generator and, if desired, of the motor is effected by control of resistance in the field circuit of the generator or of the motor and current and voltage relay means and relay means operated during deceleration and/or reversal of the motor are provided to control the said field forcing.

The present invention also includes an electric motor control system of the kind specified, wherein upon a control being exercised to alter the speed of the motor, if during acceleration or deceleration of the motor, an unsafe condition occurs such, for example, as overcurrent in the generator motor circuit, the effect of the speed regulation control is retarded. In one arrangement in accordance with the invention, when a control is effected to reduce the speed of the motor by reduction of the generator field excitation, upon the occurrence of excessive current in the generator motor circuit, the change of flux in the generator field winding is retarded.

In another arrangement in accordance with the invention, the means for accelerating the change of field flux in a machine comprises a resistance connected in circuit with the field winding of the machine and a contactor connected across the terminals of the resistance.

A motor control system operating on the Ward-Leonard principle and in accordance with the present invention will now be described by way of example with reference to the single figure of the accompanying diagrammatic drawing which shows the essential elements of the system.

Referring now to the drawing, the motor 1 of the system is adapted for use with a reversing type rolling mill which motor 1 must be capable of very rapid reversals continuously during operation thereof and is arranged to be supplied with power from a generator 2, regulation of the motor speed and direction of rotation being controlled by the excitation of the generator field winding 3 and higher speed ranges being obtained by weakening of the excitation of the motor field winding 4. Thus Ward-Leonard control may be used from 0 to 60 R. P. M. and motor field control from 60 to 150 R. P. M. The motor and generator armatures 5 and 6 are connected directly together and the motor field winding 4 supplied in series with a field weakening resistance 7 from an exciter 8, the field winding 9 of which is controlled in a suitable manner (not shown) by a master controller 10 when the speed of the motor 1 is to be in excess of 60 R. P. M. Normally, the field weakening resistance 7 is short-circuited by a contactor 11. The generator field winding 3 is supplied in series with a ballast resistance 12 from another exciter 13, the field winding 14 of which is controlled both in sense and degree of excitation in a suitable manner (not shown) by the master controller 10 to reverse the motor 1 and to give speed control up to 60 R. P. M. A normally open contactor 15 is provided for short-circuiting the ballast resistance 12 and the master controller 10 is provided besides a central "off" position with six forward and six reverse positions, the positions corresponding to 10, 30, 60, 90, 120 and 150 R. P. M.

In order to protect the system against overcurrent, against overvoltage and against overspeed of the motor 1, a current relay 16 is provided having an operating coil 17 connected in the circuit of the armatures 5 and 6 of the motor 1 and generator 2, a voltage relay 18 is provided having an operating coil 19 connected across the generator armature 6 in series with the contacts 20 of an auxiliary relay 21 and a speed balance relay 22 having two operating coils 23, 24, one coil 23 energised from a magneto 25 driven by the mill motor 1 and the other coil 24 energised from a constant potential supply 26 through a calibrating resistance 27 which is adjusted in value by the master controller 10 so that the two coils 23, 24 of the relay 22 balance each other when the mill motor 1 reaches a value of speed corresponding to the position of the controller 10.

The overcurrent relay 16 is provided with two sets of fixed contacts 28, 29, the arrangement of contacts being such that the relay opens one pair 29 and closes the other pair 28 at a predetermined value of current. Besides the three relays 16, 18 and 22, a directional or polarised relay 30 is provided which has one coil 31 energised from the magneto 25 driven by the mill motor 1 and a second coil 32 energised from the constant potential supply 26 in such a manner that the sense of its energisation is reversed when the master controller 10 is operated from, say, forward to reverse. The contacts 33 of the relay 30 are normally closed and only open when the motor 1 is rotating in the opposite direction to that corresponding to the position of the controller 10 and they are connected in series with the coil 24 of the speed balance relay 22 and the calibrating resistance 27. A further or speed responsive relay 34 is provided having an operating coil 35 supplied from the magneto 25 and its contacts 36 in series with the operating winding 37 of the contactor 11 short-circuiting the field weakening resistance 7, the contacts 36 of the relay 34 closing when the speed of the mill motor 1 exceeds 60 R. P. M.

The operating coil 38 of the auxiliary relay 21 having its contacts 20 connected in series with the coil 19 of the voltage relay 18 is connected across the operating winding 39 of the contactor 15 which short-circuits the ballast resistance 12 and the normally closed contacts 40 of the voltage relay 18, the supply of current to the operating windings 37, 39 of the contactors 11, 15 and the operating coil 38 of the auxiliary relay 21 being controlled by the current relay 16, the speed balance relay 22 and the directional relay 30. The speed balance relay 22 is provided with upper contacts 41 closed when the speed of the motor 1 is below that corresponding to the position of the controller 10 and lower contacts 42 closed when the speed of the motor 1 is above that corresponding to the position of the controller 10. One terminal of each of the operating windings 37, 39 of the contactors 11, 15 and of the auxiliary relay 38 are connected to the negative main of the constant potential supply 26 whilst the other terminals of the windings 37, 39 and coil 38 are connected to a common point 43 connected to the positive main of the supply 26 through the contacts 28, 29 and 41, 42 of the current and speed balance relays 16 and 22, the operating winding 37 of the contactor 11 associated with the motor field winding being connected to the said common point 43 through the contacts 36 of the speed responsive relay 34 and the operating winding 39 of the contactor 15 through the contactor 40 of the voltage relay 18. The common point 43 is connected to one of the upper and one of the lower contacts 28 and 29 of the current relay 16 and the other upper contact 28 of the current relay 16 is connected to one of the lower contacts 42 of the speed balance relay 22, the other lower contact 29 of the current relay 16 being connected to one of the upper contacts 41 of the speed balance relay 22. The positive main of the supply 26 is connected with the remaining upper and lower contacts 41, 42 of the speed balance relay 22 and normally, the moving contact 44 of the speed balance relay 22 contacts with neither the upper nor the lower contacts 41 or 42 of the relay 22.

The operation of the system is as follows. Assuming the motor 1 is at rest and the controller 10 is in its "off" position, when the controller 10 is moved to its first forward position I, the generator and motor field windings 3 and 4 are excited to cause the motor 1 to run up to 10 R. P. M. The speed balance relay 22 will operate to close its upper contacts 41 which energise, through the lower contacts 29 of the current relay 16, the operating coil 38 of the auxiliary relay 21 and the winding 39 of the contactor 15 associated with the generator field ballast resistance 12. The contactor 15 closes and short-circuits the ballast resistance 12 and the generator voltage is quickly built up to a value which is higher than required if allowed to persist. This effect is the so-called field forcing effect. The mill motor 1 therefore accelerates rapidly and when the motor 1 approaches 10 R. P. M. the voltage of the magneto 25 is sufficient to rebalance the two coils 23, 24 of the speed balance relay 22. The contactor 15 then opens and the generator voltage falls to its correct value. The auxiliary relay 21 effects re-setting of the voltage relay 18 without waiting for the voltage to fall to a low value. A similar action takes place when the controller 10 is moved to the second and third forward positions II and III respectively.

Should during the time the ballast resistance 12 is short-circuited a dangerous current peak occur, the current relay 16 opens its lower contacts 29 and the contactor 15 short-circuiting the resistance 12 is opened. Further, an overvoltage will have the same effect, the contacts 40 of the voltage relay 18 in series with the operating winding 39 of the contactor 15 opening.

If now the controller 10 be moved to its fourth position IV corresponding to 90 R. P. M., the speed responsive relay 34 will close its contacts 36 in series with the operating winding 37 of the contactor 11 associated with the motor field winding 4 and upon unbalance of the speed balance relay 22, the contactor 11 is opened and the field weakening resistance 7 is inserted in the circuit of the field winding 4. This action increases the ratio of acceleration of the motor 1 up to 90 R. P. M. and upon rebalance of the speed balance relay 22, the resistance 7 is again short circuited by opening of the upper contacts 41 of the relay 22. A similar action takes place in positions five and six of the controller 10. At the same time, control of the resistance 12 in the generator field circuit is effected. The occurrence of overvoltage or over-current during unbalance of the speed balance relay 22 will, of course, effect re-insertion of the resistance 12 in the generator field circuit and exclusion of the resistance 7 from the motor field circuit.

If, when the controller 10 is in the 150 R. P. M. position IV, it is moved backwardly to the "off" position, the current in the coil 24 of the speed balance relay 22 supplied from the constant potential supply 26 is reduced and finally is made zero. The other coil 23 remains energised, however, until the mill motor 1 stops and the lower contacts 42 of the relay 22 close. This closure of the lower contacts 42 of the relay 22 has no effect on the system unless the upper contacts 28 of the current relay 16 are closed. Should a heavy current occur, the contacts 28 of the current relay 16 close and the winding 39 of the contactor 15 associated with the generator field circuit is energised to short-circuit the resistance 12 in the field circuit and to increase the time constant of the generator field winding 3. Naturally, the voltage of the generator field exciter 13 is also falling due to movement of the controller 10 to its "off" position. Further, when the motor speed is above 60 R. P. M., the contactor 11 associated with motor field circuit will be energised and insertion of the resistance 7 in the motor field circuit will decrease the counter E. M. F. generated thereby.

A somewhat similar action results if the controller 10 is thrown past the "off" position to a reverse position except that in this case the sense of the energisation of the coil 32 of the directional relay 30 supplied via the master controller 10 is reversed, the contacts 33 of the relay 30 open and ensure that the lower contacts 42 of the speed balance relay 22 remain closed. If now an overcurrent peak occurs, the generator field resistance contactor 15 will close and again increase the time constant of the generator field winding 2. Finally, the motor speed falls to zero and then reverses and the directional relay 30 recloses its contacts 33. The upper contacts 41 of the speed balance relay 22 also close to effect rapid acceleration of the motor 1 in the reverse direction as in operation in the forward positions of the controller 10 described above.

Besides the various relays mentioned above, overspeed contacts 45 are provided on the motor 1 which are arranged to cut off all excitation from the motor 1 and generator 2 if the motor speed reaches any predetermined value above its maximum running speed.

I claim:

1. In an electric motor control system of the type wherein a motor is adapted to be supplied with power by a generator and a speed controller is adapted to regulate the speed of the motor by variation of the field excitation of at least one of the machines, a speed balance relay having two operating windings adapted to be energized respectively in dependence upon the actual speed of the motor and upon the required speed as defined by the setting of the speed controller, said relay being adapted to control field-forcing of at last one of said machines, and a protective relay adapted upon the occurrence of an unsafe condition such as over-current in the generator-motor circuit during change of motor speed while field-forcing is in progress, to terminate said field-forcing.

2. In an electric motor control system of the type wherein a motor is adapted to be supplied with power by a generator and a speed controller is adapted to regulate the speed of the motor by variation of the field excitation of at least one of the machines, the combination of a resistance normally connected in series with the field winding of said generator, a contactor adapted to shunt said resistance to provide for field-forcing, a magneto adapted to be driven by said motor, a speed balance relay comprising a switch oppositely actuable by two coils, electrical connections between one of said coils and said magneto, a constant potential source of power electrically connected to the other of said coils, a calibrating resistance adapted selectively to vary the voltage applied to said other coil in dependence upon the required speed of the motor as defined by the setting of the speed controller, and a protective relay responsive to unsafe conditions such as over-current in the generator-motor circuit, said speed balance relay and said protective relay being associated with said field resistance shunting contactor.

3. In an electric motor control system of the type wherein a motor is adapted to be supplied with power by a generator and a speed controller is adapted to regulate the speed of the motor by variation of the field excitation of at least one of the machines, the combination of a resistance normally connected in series with the field winding of said generator, a contactor adapted to shunt said resistance to provide for field-forcing, a magneto adapted to be driven by said motor, a speed balance relay comprising a switch oppositely actuable by two coils, electrical connections between one of said coils and said magneto, a constant potential source of power electrically connected to the other of said coils, a calibrating resistance adapted selectively to vary the voltage applied to said other coil in dependence upon the required speed of the motor as defined by the setting of the speed controller, an over-current relay having an operating winding connected in the generator-motor circuit, and an over-voltage relay having an operating winding connected in parallel with the armature of said generator, said speed balance relay, said over-current relay and said over-voltage relay being associated with said field resistance shunting contactor.

4. In an electric motor control system of the type wherein a motor is adapted to be supplied with power by a generator and a speed controller is adapted to regulate the speed of the motor by variation of the field excitation of at least one of the machines, the combination of a resistance normally connected in series with the field winding of said generator, a contactor adapted to shunt said resistance to provide for field-forcing, a magneto adapted to be driven by said motor, a speed balance relay comprising a switch oppositely actuable by two coils, electrical connections between one of said coils and said magneto, a constant potential source of power electrically connected to the other of said coils, a calibrating resistance adapted selectively to vary the voltage applied to said other coil in dependence upon the required speed of the motor as defined by the setting of the speed controller, an over-current relay having an operating winding connected in the generator-motor circuit, and an over-voltage relay having an operating winding connected in parallel with the armature of said generator, said constant potential source of power, switch, over-current relay, over-voltage relay and operative winding of said field resistance shunting contactor comprising a normally closed series circuit during field-forcing, means to reverse said motor, means to normally maintain said series circuit open while said motor is being reversed, and means to close said circuit when said over-current relay is operated during reversal.

5. In an electric motor control system of the type wherein a motor is adapted to be supplied with power by a generator and a speed controller is adapted to regulate the speed of the motor by variation of the field excitation of at least one of the machines, the combination of a resistance normally connected in series with the field winding of said generator, a contactor adapted to shunt said resistance to provide for generator field forcing, a resistance connected in series with the field winding of said motor, a contactor normally shunting said motor resistance, said contactor being adapted upon actuation to remove said shunt and provide for motor field weakening, a magneto adapted to be driven by said motor, a speed balance relay comprising a switch oppositely actuable by two coils, electrical connections between one of said coils and said magneto, a constant potential source of power electrically connected to the other of said coils, a calibrating resistance adapted to vary the voltage applied to said other coil in dependence upon the required speed of the motor as defined by the setting of the speed controller, a protective relay responsive to unsafe conditions such as over-current in the generator-motor circuit, and a speed responsive relay operable above a predetermined motor speed, said speed balance relay and said protective relay being associated with said generator field resistance shunting relay and with said speed responsive relay and said motor field shunt removing relay.

HERBERT JOHN COATES.